United States Patent [19]

Müller

[11] 4,446,934
[45] May 8, 1984

[54] BORING TOOL FOR RADIAL ENLARGEMENT OF A CYLINDRICAL FOUNDATION BORE

[75] Inventor: Norbert Müller, Wolpertswende, Fed. Rep. of Germany

[73] Assignee: Hawera Probst GmbH & Co., Ravensburg, Fed. Rep. of Germany

[21] Appl. No.: 391,160

[22] Filed: Jun. 23, 1982

[30] Foreign Application Priority Data

Jul. 4, 1981 [DE] Fed. Rep. of Germany ....... 3126472

[51] Int. Cl.³ ............................................. E21B 10/32
[52] U.S. Cl. .................................... 175/286; 175/287; 408/158
[58] Field of Search ............................... 175/286–289; 166/55.3; 408/158; 82/1.2–1.4; 411/30–31

[56] References Cited

U.S. PATENT DOCUMENTS

| | | | |
|---|---|---|---|
| 833,240 | 10/1906 | Potter | 175/289 |
| 1,244,992 | 10/1917 | Lee | 411/31 |
| 2,511,650 | 6/1950 | Robinson | 175/287 |
| 4,091,882 | 5/1978 | Hashimoto | 175/286 |

FOREIGN PATENT DOCUMENTS 2103132 8/1972 Fed. Rep. of Germany ........ 411/31

Primary Examiner—Ernest R. Purser
Assistant Examiner—Thuy M. Bui
Attorney, Agent, or Firm—Becker & Becker, Inc.

[57] ABSTRACT

A boring tool for radial widening or enlargement of a cylindrical bottom, foundation, or anchor bore. The boring tool comprises a tubular tool body having a tool shank provided for clamping in a driving machine or prime mover, and an enlarging spindle guided in the tool body and adapted to be supported on the bottom of the bore. When entering into the tool body, the enlarging spindle radially adjusts the cutting parts or elements provided for carrying out the enlargement. The tool body is formed of radially resilient segments which extend in the axial direction and delimit longitudinal slots which are open toward the front end of the tool. Cutting parts or elements are arranged on the free ends of the segments, with each part having an axial working which extends in the circumferential direction of the tool body, with those working surfaces which are adjacent one another in the circumferential direction forming the front end face of the tool body. In the starting state of the tool body, the cutting parts form a substantially complete circular ring.

14 Claims, 11 Drawing Figures

BORING TOOL FOR RADIAL ENLARGEMENT OF A CYLINDRICAL FOUNDATION BORE

The present invention relates to a boring tool for radial enlargement or widening of a cylindrical bottom, foundation, or anchor bore; the boring tool includes a tubular tool body having a tool shank provided for insertion in a prime mover or drive machine, and an enlarging spindle guided in the tool body and adapted to be supported on the bottom of the foundation bore; when entering into the tool body, the enlarging spindle radially displaces the cutting parts provided for carrying out the enlargement.

Such boring tools provide performed bottom or foundation bores with undercuts or back-tapers in order to positively anchor a peg, stud, tap bolt, etc. in, e.g., construction material.

A boring tool of this general type is disclosed by German Auslegeschrift No. 27 00 700—Hashimoto patented Oct. 16, 1980 and corresponding to U.S. Pat. No. 4,091,882—Hashimoto dated May 30, 1978. The enlarging spindle, which is supported on the bottom of the foundation bore has an enlargement segment disposed ahead of the tool body; the enlargement segment cooperates with two cutters radially adjustably mounted in the tool body, for which purpose special guides are provided. The tool shank is clamped in a prime mover which rotatably drives the boring tool. When the tool body enters the foundation bore, the enlarging spindle, after engaging the base of the bore, shifts in the tool body, and the cutters adjust radially outwardly, whereby the enlargement or widening is accomplished.

Disadvantageous with this tool is that it is not suitable for use in especially hard rock, especially not in hard, inhomogeneous material. The radially adjustable cutters easily penetrate softer parts in inhomogeneous material, and then jam, bind, or catch in the harder parts because of the depth of penetration thereof, so that the prime mover is extremely loaded. Furthermore, the binding or catching leads to damage to the bearings or journalling of the cutters in the tool body, so that the ability to radially adjust the cutters is affected, and the tool seizes tightly in the borehole during a jamming or binding of the cutters, The cutting parts quickly become dull during extreme loading, or break off easily, so that the tool must be replaced.

A rotary blow or impact application or employment of the known tool with a driving machine or prime mover according to the principle of percussion drilling is not possible, since the impacts or blows would damage the adjustment mechanism or the mounting or journalling of the cutters; furthermore, an effective utilization is not possible because of the impact reversal required by the construction. Accordingly, a relatively great drive capacity for rotary working must be provided for enlarging a foundation bore in hard rock, without hereby being able to attain a rapid advance or feed.

It is an object of the present invention to provide a boring tool, for radial enlargement of a cylindrical bottom, anchor, or foundation bore, which can be used in a rotary-blow manner even in hard materials, especially in inhomogeneous materials, and with which a rapid advance or feed can be achieved.

This object, and other objects and advantages of the present invention, will appear more clearly from the following specification in connection with the accompanying drawings, in which.

Figure 1:
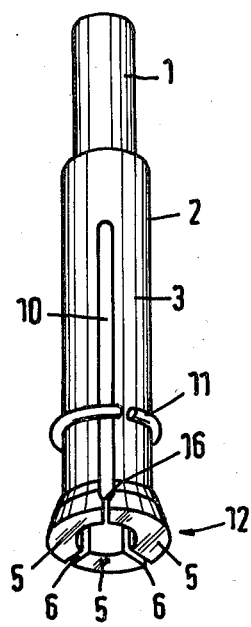
FIG. 1 is a perspective view of a tool body having features in accordance with the present invention.
Figure 2:
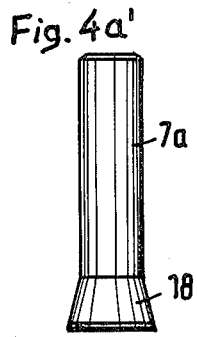
FIG. 2 is a perspective view of a flaring or enlarging spindle used in accordance with the present invention.
Figure 4D:
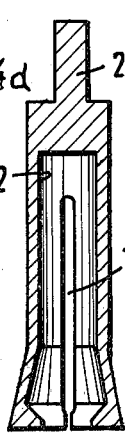
Figure 4A:
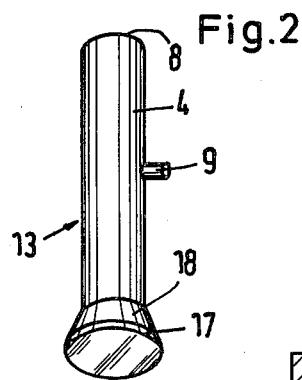
Figure 4B:
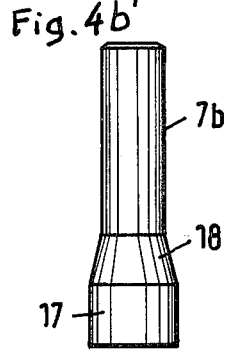
Figure 4C:
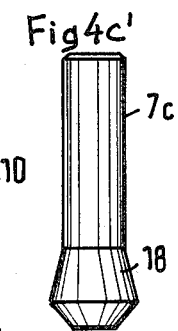
Figure 4A:
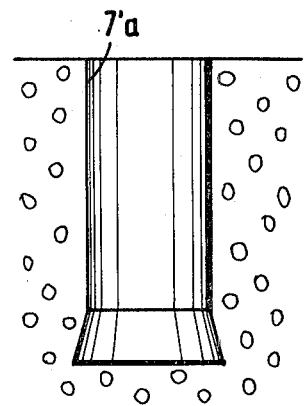
Figure 4B:
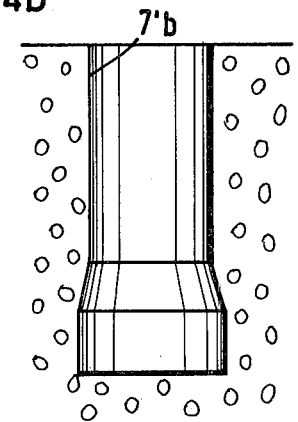
Figure 4C:
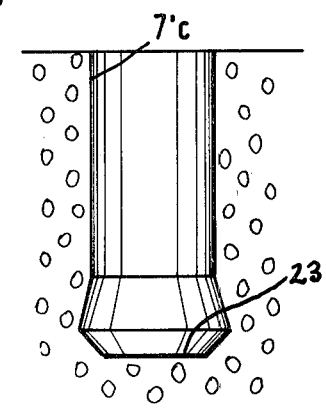
Figure 5:
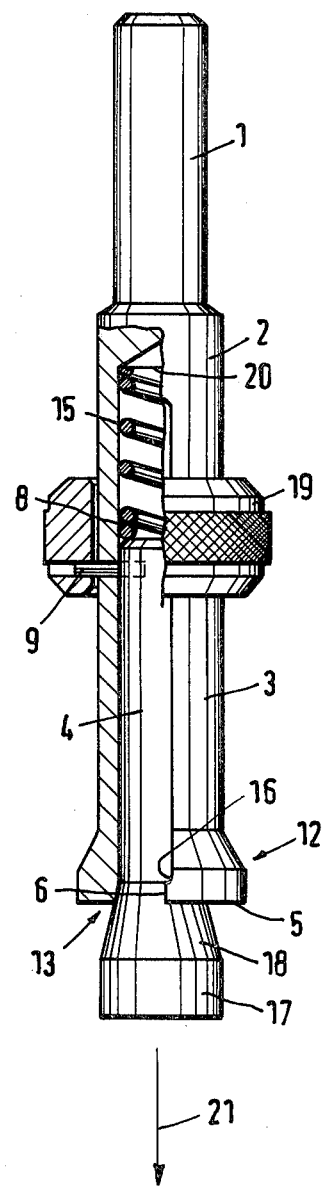

FIGS. 4a and 4a' respectively show a section through an enlarged bottom or foundation bore, as well as the flaring or enlarging spindle used to produce the same;

FIGS. 4b and 4b' respectively show a section through an enlarged bottom or foundation bore and another flaring or enlarging spindle used to produce the same;

FIGS. 4c and 4c' respectively show a section through an enlarged bottom or foundation bore and a third flaring or enlarging spindle used for producing the same;

FIG. 4d is a section through a tool body according to FIG. 1 with an inner shape or contour adapted to the flaring or enlarging spindle of FIG. 4c'; and FIG. 5 is a partially sectioned elevational view of an assembled boring tool in accordance with the present invention.

The boring tool of the present invention is characterized primarily in that the tool body is formed of radially resilient segments which extend in the axial direction and delimit elongated or longitudinal slots which are open toward the front end of the tool; on the free ends of the segments are there arranged cutting parts, each having an axial working surface which extends in the circumferential direction of the tool body, with those working surfaces which are adjacent to one another in the circumferential direction forming the front end face of the tool body; in the starting state of the tool body, the cutting parts form a substantiallly complete circular ring.

With the construction of the tool according to the present invention, the undercutting or back-tapering of the bottom, foundation, or anchor bore can be carried out with the end faces of the cutting elements, especially in a rotary-blow manner, whereby the impact applied to the tool shank is guided via the tool body directly into the material which is to be machined or worked, so that a rapid advance or feed is assured. For this purpose, the tool body is advantageously made integrally or in one piece with the radially spreadable segments. A disturbance-free machining or working is made possible, especially with inhomogeneous materials, such as reinforced concrete. The axial working surfaces frontally cut through the reinforcement, so that a jamming or binding does not arise. A simple, compact tool is provided with the inventive boring tool without a susceptible mounting; by exchanging the enlarging spindle, the position and shape of the enlargements can be any that may be desired. Consequently, the same tool body can nearly always be used to produce different enlargements, so that it is no longer necessary to have several tool bodies available.

According to further features of the present invention, the cutting parts or elements may be made of hard metal, ceramic, or similar materials, and are soldered or adhesively fastened to the free ends of the segments. Alternatively, the cutting parts or elements may be clamped to the free ends of the segments.

The cutting elements may be integral or in one piece with the segments.

The outer shape or contour of the enlarging spindle may correspond to the final shape of the borehole which is to be produced, with the inner shape or contour of the tool body preferably conforming to the outer contour of the enlarging spindle.

The enlarging spindle may be provided with an abutment which can engage the tool body and can limit the spreading procedure; the enlarging spindle may be acted on by the force of a spring in its starting position.

A guide cylinder may be connected to the spreading or enlarging portion of the enlarging spindle at that end thereof directed in the working or machining direction.

The guide segment or cylinder may have such a length that it projects from the tool body during engagement of the stop or abutment of the enlarging spindle against the tool body.

A pin which conforms to the width of the longitudinal slots may be fastened in the bolt of the enlarging spindle in such a way as to project radially therefrom; the pin may be held positively in a ring mounted so as to be axially shiftable on the tool body, with the elongated or longitudinal slots preferably being tapered at their open ends.

Referring now to the drawings in detail, the boring tool according to the present invention, for radially enlarging or expanding a cylindrical bottom, foundation or anchor bore, comprises a sleeve-like tool body 2, which is advantageously made integrally with a tool shank 1. Elongated or longitudinal slots 10, which are open toward the front end of the tool body 2, are arranged in the mantle thereof, thereby dividing the latter into radially resilient segments 3.

In addition to the integral construction of the segments 3 with the tool body 2, a construction can also be provided according to which the segments 3 are fixed individually on the tool shank 1, or on a base body (not illustrated) connected with the tool shank, in order to thus form the tool body 2.

The segments 3, because of their resilient construction, always try to assume the starting position illustrated in FIG. 1, which forms the sleeve-like basic form or shape of the tool body 2. The spring force which determines the starting position can advantageously be reinforced by a circular spring 11 which surrounds the tool body 2.

In the illustrated embodiment, the tool body 2 comprises three resilient segments 3; however, any number of segments 3 can be provided.

Cutting elements 12 are arranged at the free ends of the segments 3. These cutting elements extend in the circumferential direction, and respectively form the front end of a segment 3. The cutting parts or elements 12 have an axial working or machining surface 5 with radial cutting edges 6, with the working surface of the cutting part forming the end face axial working or machining surface 5 of the tool body 2. During the expansion or spreading, the working or machining surface 5 assumes a slightly V-shaped position relative to the flaring or enlarging spindle, as a result of which an axial force applied to the tool body 2 attempts to eliminate the inclined position. In this way, during the working or machining operation, e.g. during boring or percussion drilling, the segments 3 are firmly pressed against the enlarging spindle.

The cutting parts 12 are advantageously made of hard metal or alloy, ceramic, or similar materials, and are soldered or fastened with adhesive to the free ends of the segments 3. It can also be advantageous to clamp or press fit the cutting parts 12 on the free ends of the segments 3, so that the cutting parts 12 can be easily exchanged.

In a preferred embodiment, the cutting parts 12 are constructed integrally with the segments 3, so that connection problems between the cutting parts 12 and the segments 3 do not arise.

Radially oriented cutting teeth 14 are advantageously arranged on the working surface 5 of the cutting elements 12 (FIG. 3), as a result of which a rapid advance or feed is ensured even in extremely hard materials.

In their starting position (FIG. 1), the cutting parts 12 form a nearly closed circular ring, so that the tool body can also be used as a drill to make a bottom, foundation or anchor bore in light rock.

The bolt 4 of a flaring or enlarging spindle 13 is axially shiftably disposed in the tool body 2, with a radially projecting pin 9 fixed in the bolt 4 coming to rest in the longitudinal slot 10 of the tool body 2. The open ends 16 of the longitudinal slots 10 are tapered to keep the enlarging spindle 13 from being axially detached, in which connection the pin 9 advantageously has a diameter corresponding approximately to the width of the longitudinal slot 10. To exchange an enlarging spindle 13, the free end 16 is widened beyond the diameter of the pin 9 by spreading apart or enlarging the tool body 2, so that the enlarging spindle 13 can be axially removed therefrom. In the rest position, an enlarging or flaring cone 18 fastened to one end of the bolt 4 projects from the tool body 2. The enlarging cone 18 is advantageously extended by a guide cylinder 17 having a diameter which essentially corresponds to the diameter of the already produced bottom or foundation bore, so that the tool body can be reliably centered in the bottom or foundation bore, and the boring tool can be guided in the working or machining position in such a way as to produce a true borehole.

The guide cylinder 17 advantageously has such a length that when the enlarging spindle 13 is in its maximum retracted position, the guide cylinder 17 still projects from the tool body 2 in order thus also after spreading of the tool body to still ensure a satisfactory centering.

The maximum spread or expanded position of the tool body 2 is advantageously limited by a stop or abutment 8 which is formed by that end of the bolt 4 located in the tool body 2. The stop or abutment 8 comes into engagement against the bottom 20 of the tool body 2, thus limiting the axial displacement of the enlarging spindle 13 (FIG. 5).

The shape of the widening, flaring, or enlarging cone 18 determines the final shape of the bottom, foundation, or anchor bore which is to be expanded and/or determines the provided undercut or back-taper thereof. As illustrated in FIGS. 4a, 4a', 4b, 4b', and 4c, 4c', the outer shape or contour 7a, 7b, 7c of the enlarging spindle 13 corresponds to the section through the enlarged or widened bottom or foundation bore 7'a, 7'b, 7'c. The inner shape or contour 22 of the tool body 2a in FIG. 4c' is adapted to the outer shape or contour 7c of the enlarging spindle 13. With this construction, the cutting parts 12, upon reaching the borehole base 23, return to their original diameter of the starting position, so that the tool can be immediately withdrawn from the borehole after termination of the working operation. A ring or collar 19 is provided according to FIG. 5 for withdrawing the enlarging spindle 13 from the tool body 2; the ring 19 is positively connected by one of the pins 9 with the enlarging spindle 13.

Figure 3:
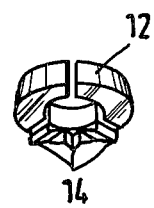
FIG. 3 is a perspective view of cutting parts used in accordance with the present invention.

The completely assembled tool is illustrated in FIG. 5. The tool shank 1 is coupled with a rotary impact or blow drive, and the guide cylinder 17 is inserted in the preformed borehole, which is not illustrated in greater detail. The axial end face, which according to FIG. 3, is advantageously equipped with cutting teeth 14, penetrates rotatably or in a rotary-impact manner into the material. If the guide cylinder 17 engages the base of the bore, the segments 3 are spread radially outwardly while gliding on the widening or enlarging cone 18, so that the working surface 5, with the cutting edges 6 and the cutting teeth 14, rotatably or in a rotary-impact manner frontally produces an undercut or back-taper which corresponds to the widening or enlarging cone 18.

During retraction of the boring tool, the enlarging spindle 13 experiences an axial force directed in the working or machining direction 21 because of the spring effect of the segments 3, and also possibly because of a spring ring 11; this force permits the enlarging spindle 13 to return to its starting position outside of the tool body 2, and the tool body 2 again occupies its tubular basic shape. The cutting parts now again form a nearly complete circular ring. If the enlarging spindle 13 has an outer contour 7a or 7b according to FIG. 4a' or 4b' respectively, it can return without mechanical aid to its starting position already via the hammer impacts of the driving engine or prime mover, for instance a hammer drill, onto the tool shank end 1 when the bearing or engagement pressure on the cutting parts or elements 12 is withdrawn. The bolt 4 is advantageously acted upon by the force of a spring 15 in its starting position, whereby a reliable return is assured. The spring 15 is advantageously located between the stop or abutment 8, and the bottom 20 in the tool body 2 (FIG. 5).

To manually return the enlarging spindle 13, a ring 19 of metal or synthetic material is advantageously provided in such a way as to be axially displaceable on the outer periphery of the tool body 2; the extended pin 9 of the bolt 4 engages positively in this ring 19. The ring 19 lies with radial play 24 on the tool body 2, so that the tool can spread or expand, without this ring preventing such spreading, or without the ring jamming or binding. The position of the ring 19 is determined by the positively engaging pin 9.

The boring tool according to the present invention comprises only a few parts, and is simple and compact in construction. The tool is economical and assures a long service life.

A considerable advantage according to the present invention is provided thereby that the tool can be used in a rotary-impact manner for working or machining hard, inhomogeneous material, such as concrete, since the surface-working cutting parts 12 cannot catch or jam because of the resilience of the segments 3. The tool according to the present invention operates extensively free of disturbance, since the jamming, catching, or binding of the cutters encountered with single-cutter tools is avoided during a change from binder to individual, hard additives, e.g. in concrete.

Moreover, the tool according to the present invention can also be used in reinforced concrete. In order to make an undercut or back-taper, a bore is produced which corresponds to the maximum outer diameter of the enlarging spindle 13; the head of the enlarging spindle 13 is inserted into this bore. The cutting parts or elements 12 of the inventive tool work axially against the concrete, whereby the cutting parts 12 frontally cut through the reinforcements encountered within their range or outer field.

The present invention is, of course, in no way restricted to the specific disclosure of the specification and drawings, but also encompasses any modifications within the scope of the appended claims.

What I claim is:

1. A boring tool for radially enlarging a cylindrical foundation bore which has a bottom, said tool being intended for rotary-blow operation and use with a prime mover; said tool in combination comprising:
    a tubular cylindrical tool body having a first end and a second end, said first end being provided with a tool shank for insertion in said prime mover; said tool body including resilient segments separated from each other by radially extending slots defining openings extending radially thereof, one end of said segments forming said second end of said tool body, which respectively extend in the axial direction of said tool body, and which delimit between one another longitudinal slots which are open toward said second end of said tool body;
    radially adjustable cutting elements securely connected to the second end of said tool body located coaxially therewith and projecting peripherally as arranged on said radially spreadable segments of said second end of said tool body for effecting said enlargement of said foundation bore, each cutting element having an axial working surface which extends in the circumferential direction of, i.e. substantially perpendicular to the axis of, said tool body, with those working surfaces which are adjacement to one another in the circumferential direction forming the front end face of said tool body; said cutting elements, in the starting position of said tool body, forming a substantially complete circular ring though adjustable radially such that circumferentially particularly an outermost peripheral cutting edge thereof is greater than circumference of said tool body; and
    an enlarging spindle which is guided in said tool body and is adapted to be supported on said bottom of said foundation bore; said enlarging spindle, when fully entering said tool body, displacing said cutting elements radially outwardly so that said cutting elements including said resilient segments thereon after each blow exerted axially upon said tool body can spread resiliently in radial direction therefrom and returning into starting position thereafter.

2. A boring tool for radially enlarging a cylindrical foundation bore which has a bottom, said tool being intended for use with a prime mover; said tool comprising:
    a tubular tool body having a first and second end, said first end being provided with a tool shank for insertion in said prime mover; said tool body including radially resilient segments, one end of which form said second end of said tool body, which respectively extend in the axial direction of said tool body, and which delimit between one another longitudinal slots which are open toward said second end of said tool body;
    cutting elements arranged on said radially spreadable segments of said second end of said tool body for effecting said enlargement of said foundation bore, each cutting element having an axial working surface which extends in the circumferential direction of, i.e. substantially perpendicular to the axis of, said tool body, with those working surfaces which are adjacent to one another in the circumferential direction forming the front end face of said tool body; said cutting elements, in the starting position of said tool body, forming a substantially complete circular ring; and an enlarging spindle which is guided in said tool body and is adapted to be supported on said bottom of said foundation bore; said enlarging spindle, when fully entering said tool body, displacing said cutting elements radially outwardly, said enlarging spindle including a bolt guided in said tool body; in which at least one pin, which conforms to the width of said longitudinal slots, is fastened in said bolt in such a way as to project radially therefrom; and which includes a ring which is mounted so as to be axially shiftable on said tool body, said pin being held positively in said ring.

3. A boring tool according to claim 2, in which said tool body is integral with said radially spreadable segments.

4. A boring tool according to claim 2, in which said cutting elements are made of material selected from the group consisting of hard metals, ceramics, and other hard materials, and are fastened to that end of said radially spreadable segments forming said second end of said tool body.

5. A boring tool according to claim 4, in which said cutting elements are clamped to that end of said radially spreadable segments forming said second end of said tool body.

6. A boring tool according to claim 4, in which said cutting elements are integral with said radially spreadable segments.

7. A boring tool according to claim 2, in which the outer contour of said enlarging spindle corresponds to the final shape of the borehole which is to be produced from said foundation bore.

8. A boring tool according to claim 7, in which the inner contour of said tool body conforms to the outer contour of said enlarging spindle.

9. A boring tool according to claim 2, in which said enlarging spindle is provided with an abutment which is adapted to engage said tool body and limit the spreading procedure; and which includes a spring for acting on said enlarging spindle in the starting position thereof.

10. A boring tool according to claim 9, in which said enlarging spindle is provided with an enlarging portion at that end thereof remote from said first end of said tool body; and which includes a guide cylinder connected to that side of said enlarging portion remote from said first end of said tool body.

11. A boring tool according to claim 10, in which said guide cylinder is of such a length that it projects from said second end of said tool body during engagement of said abutment of said enlarging spindle against said tool body.

12. A boring tool according to claim 2, in which said open ends of said longitudinal slots are tapered.

13. A boring tool according to claim 11 in which cutting teeth are arranged on the working surface of said cutting elements.

14. A boring tool according to claim 11 in which cutting edges are formed by radial boundary edges of said cutting elements located between the longitudinal slots.

* * * * *